United States Patent [19]
Sato

[11] 3,716,247
[45] Feb. 13, 1973

[54] METAL CHUCK FOR USE IN A DENTAL HANDPIECE

[75] Inventor: Kenzo Sato, Kyoto, Japan

[73] Assignee: Kabushiki Kaisha Morita Seisakusho, Kyoto, Japan

[22] Filed: Dec. 11, 1970

[21] Appl. No.: 97,179

[30] Foreign Application Priority Data

Dec. 25, 1969 Japan..............................44/104553

[52] U.S. Cl...................................279/15 G, 279/46
[51] Int. Cl. ................................................B23b 31/08
[58] Field of Search ........279/51, 53, 46, 1 DC, 1 SG

[56] References Cited

UNITED STATES PATENTS 3,499,223  3/1970  Lieb et al............................279/53 X
495,267    4/1893  Richmond..............................279/51

Primary Examiner—Andrew R. Juhasz
Assistant Examiner—Z. R. Bilinsky
Attorney—Christensen, Sanborn & Matthews

[57] ABSTRACT

A metal chuck for use in a dental handpiece for holding a dental tool which comprises a tubular body and a plurality of claws integral with the body. The chuck is secured in the axial through bore of the air-turbine rotor enclosed in the handpiece. A dental tool is inserted through the tubular body to be secured by friction between the contacting surfaces of the body and the tool, with the claws resiliently clamping the tool thereby holding the same all the more securely in the chuck.

3 Claims, 3 Drawing Figures

PATENTED FEB 13 1973 3,716,247

INVENTOR
KENZO SATO
BY
Christensen Sanborn &
Matthews
ATTORNEYS

METAL CHUCK FOR USE IN A DENTAL HANDPIECE

This invention relates to a metal chuck enclosed in a dental handpiece for holding a dental tool to be used for treatment.

As is well known, the dental handpiece of the type with which this invention is concerned encloses a rotor to which a rotary dental tool is secured by means of a chuck. There are two types of chucks, that is, a metal chuck and a plastic chuck. Although the former is capable of holding a dental tool with a high degree of accuracy, it has the disadvantage that a wrench or the like tool is required to secure the dental tool to the chuck or detach it therefrom and it is troublesome to use a wrench whenever the dental tool is attached to or detached from the handpiece. To avoid the use of the wrench or the like, a chuck has been proposed in which friction is used to hold the dental tool in the chuck. However, since it is necessary for the chuck to tightly hold the dental tool, the friction between the contacting surfaces of the chuck and the dental tool must be considerably large, so that that portion of the dental tool (commonly referred to as the "bar" or "shank") which is in contact with the chuck is very likely to be scarred or damaged due to the high degree of friction.

It is easy to attach the dental tool to or detach it from the plastic chuck, but once the bar or shank of a dental tool having a large diameter has been inserted into the chuck, the inner diameter of the chuck is likely to be enlarged since it has a low restoring force, so that the clamping force of the chuck decreases with a resulting danger of the dental tool slipping off therefrom during use in dental treatment. Moreover, this type of chuck has a relatively short life, so that it must often be replaced by a new one.

Accordingly, it is one object of the invention to provide a novel and improved metal chuck of the friction type.

Another object of the invention is to provide a metal chuck which is designed to hold a dental tool by means of both friction and spring force.

The metal chuck constructed in accordance with this invention is enclosed in an axial through bore formed in the air-turbine rotor of a dental handpiece and secured in place therein for rotation with the rotor. The chuck comprises a tubular body and a plurality of clamping claws circumferentially spaced and extending generally axially of the rotor bore from one end of the tubular body. The claws may be formed by forming a plurality of circumferentially spaced, generally axially extending slots or recesses in an integral tubular extension of the tubular body. The tubular extension comprising the claws has a smaller inner diameter at its outer end then the outer diameter of the bar of a dental tool to be held by the chuck. Also the outer diameter of the tubular extension is reduced toward its outer end for the purpose to be described later. In other words, each of the claws is curbed inwardly toward the axis of the tubular extension and becomes thinner toward its outer end. When the bar of a dental tool is pushed into the chuck, the circumferential surface of the bar contacts the inner surface of the tubular body so that the bar is held in place by friction, and at the same time since the claws are pushed radially outwardly by the bar of the dental tool against the resiliency of the claws, they hold the bar all the more securely.

However, since the chuck is rotated simultaneously with the rotor at a very high speed, the centrifugal force produced by the rotation would act on the outer ends of the claws so as to open them radially outwardly thereby reducing the clamping force of the claws. To avoid this, the outer ends of the claws are made as thin as possible thereby reducing the weight of the outer ends of the claws and consequently the centrifugal force to such a level as not to cause any substantial effect on the clamping force of the claws on the bar of the dental tool.

The invention will become more apparent from the following description of a preferred embodiment thereof with reference to the accompanying drawing wherein.

Referring now in detail to the drawings, there is shown an air-turbine rotor 1 having a plurality of radial blades 2. As is well known, the rotor is supported by a conventional air bearing for rotation in the rotor casing, not shown, of a dental handpiece. When compressed air is jetted against the turbine blades, the rotor is rotated at a high speed of 400,000 to 600,000 r.p.m.

Figure 1:
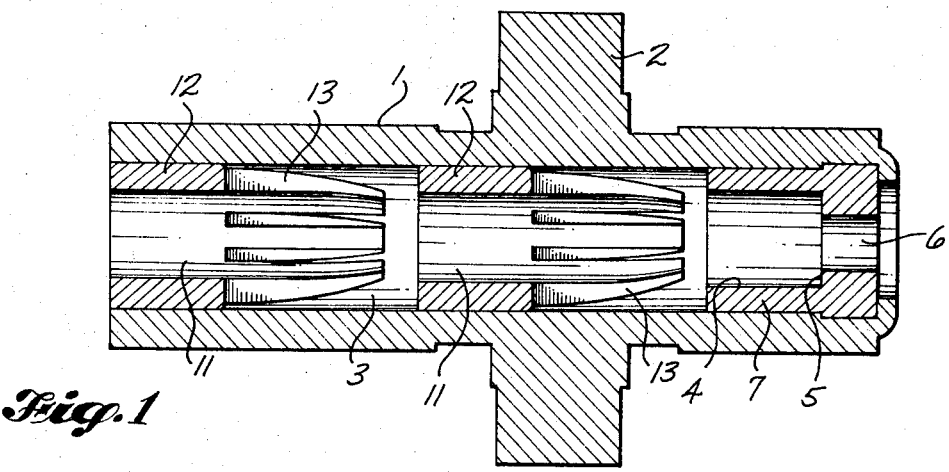
FIG. 1 is a sectional view of an air turbine rotor of a dental handpiece.
Figure 2:
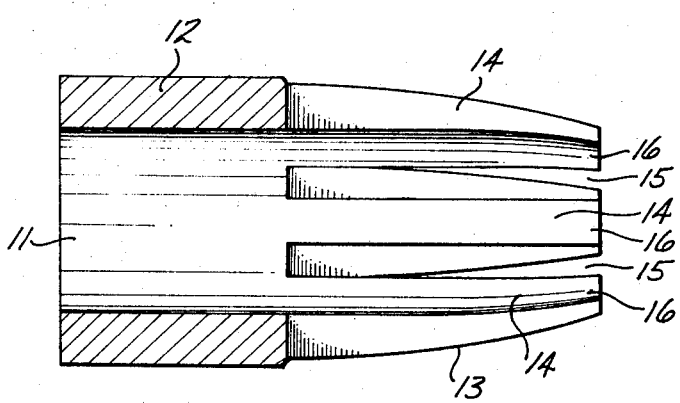
FIG. 2 is an enlarged sectional view of a metal chuck constructed in accordance with the invention.
Figure 3:
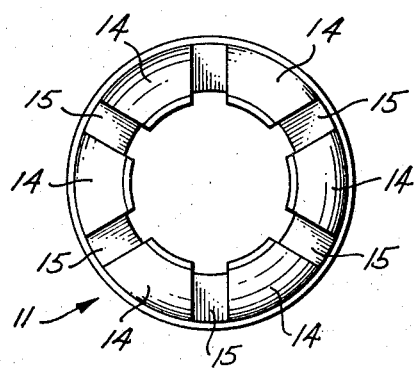
FIG. 3 is a right-hand side view of FIG. 2.

The rotor 1 is formed with an axial through bore 3. A guide piece 7 is provided in one end (the right-hand end in FIG. 1) of the bore 3 of the rotor and has a guide surface 4, a stop shoulder 5 and an end hole 6. The shoulder 5 thus defines a socket with the left hand portion of the bore 3. When a dental tool is inserted into the rotor bore 3, its bar is passed through two chucks 11 enclosed in the bore 3 and guided by the surface 4 as far as it hits the stop shoulder 5. When the tool is to be separated from the rotor, a pin may be inserted into the hole 6 to push the end of the tool bar out of the rotor bore 3.

Each of the two metal chucks 11 comprises a tubular body 12 and a clamping portion 13 integral with the body 12. The outer circumferential surface of the body 12 is in frictional contact with the inner circumferential surface of the bore 3 so that the chuck is secured in place in the bore 3. The clamping portion 13 comprises a plurality of circumferentially spaced, generally axially extending claws 14. The claws 14 may be formed by forming a plurality of circumferentially spaced slots 15 in a tubular extension of the body 12. The clamping portion 13 has its outer circumferential surface made of a parabolic shape in longitudinal section, with its outer diameter being reduced toward its outer end, so that each claw 14 becomes thinner toward its outer end 16. The inner diameter of the clamping portion 13 near the body 12 is substantially the same as that of the body 12 but is gradually reduced toward its outer end. In other words, the outer end of each claw 14 has its inner surface inwardly curved toward the axis of the chuck along an arc of a circle.

A single or more chucks of the above described construction are disposed in axial alignment with each other in the axial bore 3 of the rotor 1. A rotary dental tool, not shown, to be attached to the rotor has its bar inserted into one end (the left-hand end in FIG. 1) of the rotor. As the bar of the tool is forced through the two chucks pushing the claws 14 radially outwardly as far as it enters the guide piece 7 to be stopped by the shoulder 5. In this position, the bar of the dental tool is held by the tubular body 12 of each chuck 11 due to the friction between the contacting surfaces of the tubular body 12 and the tool bar. At the same time, since the claws 14 are pushed radially outwardly, their spring force resiliently clamps the bar so that the chuck holds the tool all the more securely.

As previously mentioned, the rotor of this type is rotated at a very high speed of 400,000 to 600,000 r.p.m. so that a considerably great centrifugal force acts on the outer free ends of the claws 14. Since the centrifugal force acts on the claws in the direction opposite to their clamping force, it is necessary to counteract the centrifugal force. To this end, the claws 14 are so designed as to have a greater clamping force at the outer ends thereof. This would result in production of a great stress in each claw which would cause a greater fatigue than could be withstood by the material of the claws. This undesirable result can be avoided by increasing the number of claws to be provided thereby greatly reducing the stress produced in each claw far below the maximum level of fatigue that can be withstood by the material of the claw. The provision of two or more chucks in a single rotor also helps to further reduce the stress produced in the claws. With the above arrangement, it is possible to retain the required clamping force of the chucks for a long time without materially weakening the mechanical strength of the claws.

On the other hand, the centrifugal force acting on the claws must be reduced for the reason previously mentioned. To this end, each claw 14 is made thinner and consequently lighter in weight toward its outer end, with a resulting decrease in the centrifugal force acting thereon.

The metal chuck of the invention has the following advantages: that it is easy to attach a dental tool to the rotor or detach it therefrom, and to do this, no particular clamping tool such as a wrench or the like is required; that the chuck has a high degree of wear resistance; that it is possible to securely hold the bar of a dental tool without so much friction as to scar or damage the bar; and that the chuck has a long life since the stress produced by the centrifugal force in the claws is minimized.

What I claim is:

1. In combination, a rotary device which has a walled, open ended socket therein that is adapted to receive the shank of a dental handpiece to be driven thereby, and a chuck disposed in the socket to detachably engage the shank of the handpiece, which chuck is spaced apart from the bottom of the socket, in the direction of the open end thereof, and has a bore extending therethrough on the rotational axis of the device, that is adapted to frictionally but slidably engage with the shank as it is received in the socket, to permit the shank to be passed through the chuck, and inserted beyond the distal end of the bore into the space between the chuck and the bottom of the socket, there being a series of circumferentially spaced, axially extending, and axially inwardly curved claws extending into the space from the distal end of the chuck, which claws are spaced apart from the wall of the socket at the distal end portions thereof, by an open annular clearance therebetween, and have an inside diameter at the distal ends thereof, of less than that of the bore of the chuck, so that they are engaged by the shank when it is inserted into the socket beyond the bore of the chuck, but the claws are also resiliently yieldable to the shank, so that they flex into the clearance between the wall of the socket and the distal end portions of the claws, while exerting a clamping action on the shank so long as it resides between said portions.

2. The combination according to claim 1 wherein the rotary device is defined by an elongated tube-like rotor having a stop in one end portion thereof, forming a socket that opens at the other end thereof.

3. The combination according to claim 1 wherein the claws are progressively thinner as they extend toward the distal ends thereof.

* * * * *